United States Patent Office 3,476,553
Patented Nov. 4, 1969

3,476,553
PRECIPITATE FLOTATION PROCESS
Felix Sebba, University of Witwatersrand, Milner Park, Johannesburg, Republic of South Africa, and Charles W. Jonaitis, Chicago, Charles L. Ray, Wheaton, and Robert E. Baarson, La Grange, Ill.; said Jonaitis, said Ray and said Baarson assignors to Armour and Company, Chicago, Ill., a corporation of Delaware
No Drawing. Continuation-in-part of application Ser. No. 818,501, June 3, 1959. This application Feb. 10, 1965, Ser. No. 431,693
Int. Cl. C22b 3/00; B03d 3/06
U.S. Cl. 75—108                                      7 Claims

ABSTRACT OF THE DISCLOSURE

Metals in solution are recovered by introducing hydroxyl ions to precipitate the metals as insoluble hydroxides and introducing a collector reagent which attaches to the hydroxides. Finely-divided gas is introduced to form bubbles and to buoy the hydroxides to the surface while maintaining the surface quiescent so that the bubbles remain intact forming a scum. The scum is removed and the metals recovered by reducing the hydroxides.

---

This invention relates to the recovery of metals from solution, and more particularly to recovery of metals by introducing a metal precipitant into the solution to form a precipitated product of the metallic element and recovering the product from the solution.

This application is a continuation-in-part of copending application Ser. No. 818,501, filed June 3, 1959, now Patent No. 3,203,968, and a continuation of copending application Ser. No. 192,343, filed May 4, 1962, now abandoned.

Various processes have been employed in the mining industry to extract soluble metals from solution. Two processes that have been used are ion exchange and solvent extraction. A recently adopted process in the leach-precipitate-flotation, or LPF, system. Though these processes successfully recover metals from solution, they leave much to be desired from the standpoint of economy and efficiency, especially when recovering metals from dilute solutions.

It has also been proposed to recover metals in a more efficient manner by employing a process known as ion flotation. This process is disclosed in patent application Ser. No. 818,501, now Patent No. 3,203,968, by Felix Sebba, and consists of treating a metal-bearing solution with an organic surface-active collector. The collector is chosen so that an insoluble reaction product is formed in the solution which is comprised of a stoichiometric relationship between the collector and the metal. The compound formed has physical properties such that it may be buoyed to the solution's surface and removed therefrom as a scum. This process, through efficient, utilizes an amount of surface-active collector which approaches a mole equivalent of collector per mole equivalent of metal ion in solution. Thus, in most cases, it is necessary that the recovery product be recycled to separated and recover the reagent for re-use.

In the process of the present invention, we first form artificial insoluble particles and then collect such particles in separate procedures, and this is accomplished while utilizing substoichiometric amounts of a surface-active collector.

An object of the invention is to provide an economical process for recovering metals from solutions, including relatively dilute solutions. A further object is to provide a process which utilizes substoichiometric amounts of a surface-active collector while producing a high recovery of metals from the solution. Yet another object is to provide a process for selectively recovering specific metals from a mixture of metals in solution and while utilizing a minimum of operating equipment. Other objects and advantages of the invention will appear as the specification proceeds.

We have discovered an extremely efficient process for the recovery of metals for metal-containing solutions. Generally, our process comprises introducing hydroxyl ions into a metal-containing solution to precipitate the metals present as insoluble metal hydroxide floccules or insoluble basic salt or basic hydroxide. These floccules are removed from the solution by contacting the floccules with substoichiometric mole equivalents of surface-active collector per mole equivalent of metal ions present in the solution and by introducing finely disseminated gas bubbles into the solution which buoy the floccules to the surface where they are removed as a filterable scum.

Generally speaking, the metals that may be recovered from solution by our process are those that will form a substantially insoluble hydroxide percipitate or insoluble basic salt or basic hydroxide of metal in solution when hydroxyl ions are introduced into the solution. These meals are aluminum and the alkaline earth metals such as beryllium and magnesium; the metals and transition metals such as zinc, cadmium, mercury, antimony, lead, iron, manganese, chromium, cobalt, nickel, copper, silver, indium, titanium, molybdenum, vanadium, and the like; the rare earth metals as in the lanthanide and actinide servies such as lutecium, cerium, praseodymium, neodymism, uranium, vanadium, thorium, and the like.

Our invention will perhaps find its greatest utility in recovering metals existing at various concentrations in leach liquors, naturally occurring mine waters, and metal-containing industrial effluents. Leach liquors are acid solutions in which ore has been placed to dissolve the metals present therein into solution. Acids such as sulfuric acid are used to dissolve the metals, such as copper and iron, into solution. Mine waters are, in general, those natural waters that have picked up metals by coming in contact with metal-containing ore. Examples of industrial effluents would be effluents from metal plating proceses, various mineral processing waste waters, and the like.

The hydroxyl ions that are introduced into the metal-containing solution may be provided by the alkali hydroxides or ammonium hydroxides, or lime. It should be noted that the upper pH of the solution should be carefully controlled when using ammonium hydroxide to prevent formation of complex ammonium salts. Complex ammonium salts have been found to interfere with successful practice of the invention. The upper pH may also need to be controlled to avoid reaching a situation where flotation ceases.

Examples of hydroxides that may be used to provide hydroxyl irons are calcium (lime), sodium, potassium, lithium, ammonium, rubidium and cesium hydroxide. Sodium or calcium hydroxides are the preferred hydroxides used in our process, because of abundance and economy.

As the alkali hydroxide is added to the solution, it is distributed throughout and immediately begins to combine with the metals therein to form a metal hydroxide. It is significant that if there are sufficient hydroxyl ions present, they will combine with substantially all of the metal ions present in solution.

The amount of hydroxide added to a metal-containing solution in the process of our invention is limited to that amount which will raise the pH of the solution sufficiently to provide optimum precipitation of those metals known to be present and which are desired for recovery. Optimum precipitation of metal hydroxides generally occurs in a different pH range for each metal, therefore the amount of hydroxide will also vary with each metal. For example, copper will precipitate best in a pH of about 6 through 9, whereas iron will precipitate faster at a lower pH of about 4.5 to about 6.0. Copper will precipitate at a pH below 6 and also above 9; however, optimum precipitation is achieved within the range of 6 through 9. Likewise, iron will begin to precipitate before a pH 4.5 is reached but will precipitate more completely at a pH of about 4.5 to 6.0. In light of the fact that there is a specific optimum pH range for each given metal, it is not possible to generalize on the amount of hydroxide that should be added to precipitate a metal hydroxide. That pH range where there is optimum precipitation of a given metal hydroxide for the practice of this invention must be empirically determined prior to incorporation of a given pH range in a process. Further, precipitation may be interfered with by the presence of non-metal ions in the solution as well as by complex salts of ammonia, as mentioned. Thus, the specific solution from which the metal or metals are to be recovered should be tested to determine the amount and kind of hydroxide to add prior to recovering metals on an industrial scale. The amount of alkali hydroxide added to a given solution will thus be determined by taking into consideration the pH of the solution prior to the addition of hydroxide, the impurities, i.e., non-metal ions, complex salts, etc., the specific metal or metals to be recovered from solution, and also by the type of surface-active collector being used. The surface-active collector used in some cases may govern the optimum pH range, because some collectors are known to be more efficient at one pH than another.

The metal hydroxide precipitate that forms upon addition of alkali hydroxide is a colloidal type precipitate that remains suspended or settles very slowly in the solution as floccules. The size of the floccules depends, of course, on the specific metal hydroxide that is formed. The metal hydroxide floccules that are suspended in solution are, in general, gelatinous, insoluble and unfilterable. The floccules appear in various colors in solution; for example, copper hydroxide floccules are blue and iron hydroxide floccules are brown. If the solution from which metals are being recovered contains a mixture of metals such as iron and copper, and these metals are being recovered together, the floccules will appear various shades of green, depending on the ratio of iron to copper.

After the metal hydroxides have precipitated as insoluble, unfilterable floccules or colloidal precipitates, they are rendered hydrophobic and more easily filterable by contacting them with an ionically charged surface-active collecting reagent.

The surface-active collectors utilized in our invention are referred to as ionically charged surface-active collectors. Either a positively or negatively charged collector is operable in our process and both cationic and anionic collectors have been used with good results. Generally speaking, suitable collectors are those ionic surface-active collectors used in ore flotation procedures. These collectors must have at least one hydrophilic center of activity and at least one aerophilic (gas avid) center of activity.

The number of carbon atoms in the aerophilic portion or portions of the collector molecule required to impart desired aerophilic properties to the collector varies with the type of collector. Generally, from 5 to about 24 and preferably from 8 to 22 carbon atoms, are found in at least one aerophilic portion of the collector molecule. The preferred cationic and anionic collectors are derived from plant and animal triglycerides, preferably vegetable or marine triglycerides. These glycerides can be hydrolyzed to free fatty acids which can then be utilized as anionic collectors per se, or which can be converted to ammonium or alkali metal salts for similar puropses.

When a cationic collector is desired, the fatty acids are converted to amines or quaternary salts by known means. Where quaternary ammonium collectors, diamine collectors or triamine collectors are utilized, it is especially preferred that the collectors contain at least one hydrocarbon radical containing from 8 to 22 carbon atoms.

The following list of surface-active collectors is illustrative of some of those that might be used, but is not exclusive:

Examples of cationic collectors which are operable for collecting metal hydroxides from solution include the quaternary ammonium compounds such as trimethyl-n-octylammonium chloride, trimethyl-n-decyl ammonium chloride, trimethyl-n-dodceylammonium chloride, trimethyl-n-octadecylammonium bromide, triethyl-n-hexadecylammonium iodide; mixtures of quaternary salts derived from tallow fatty acids, from cottonseed oil fatty acids, from soybean oil fatty and coconut oil fatty acids, from mixtures of fatty acids derived from tallow, corn oil, soybean oil, coconut oil; alkyl amines such as diamylamine, didodecylamine, n-decylamine, n-tetradecylamine, tri - n-octadecylamine, n-octadecylamine and mixtures of amines; and miscellaneous collectors such as ammonium phenylnitrosohydroxylamine, 1 - n-dodecylpyridinium iodide, octadecyl β-hydroxyethyl morpholinium bromide, β-stearamidophenyl trimethylammonium methylsulfate, octadecyl pyridiniumiodide, octadecyl α-picolinum bromide, hexadecyl quinolinium bromide, decylstyrylpyridinium chloride, dodecylpyridinium phenylsulfonate, dimethyldodecylphenylammonium phenylsulfonate, 2 - mercaptobenzothiazole derivatives, various imidazoline and imidazolidine derivatives and dimethyl-n-hexadecylbenzylammonium chloride.

Anionic collectors are of two types: the oxhydryl compounds, where a metal or hydrogen is connected to the hydrocarbon element of the collector through an oxygen atom, and the sulfhydryl type where the connection is made through a sulfur atom. The oxhydryl collectors include carboxylates, acidalkylsulfates, sulfonates and phosphates and phosphonates. The sulfhydryl compounds includes mercaptans, thiocarbonates (xanthates), thioureas and dithiophosphates. Examples of anionic collectors include the acids and sodium, potassium or ammonium salts of rosin, the tall oils and animal and vegetable oils; napthenic acids; sodium-n-octylsulfate; potassium - n - dodecylsulfate; the ammonium salts of n-dodecyldiethylene-glycolsulfate; the sodium salt of crude or refined petroleum sulfonic acid; β-phenylpropionic acid; pelargonicacid; mixtures of acids derived from linseed oil, soybean oil, palm oil, corn oil and cottonseed oil; monosodium a-sulfopalmitate; and disodium a-sulfostearate, 1,3-diphenyl-2-thiourea and thiocarbanilide. The above-described examples of cationic and anionic collectors are but a few of the many collectors which are known to be commercially practicable and which are used in flotation procedures.

Of the many collector reagents, we prefer to use petroleum sulfonates, primary amines derived from soya fatty acids, di-amines derived from coco fatty acids, quaternary ammonium chloride derived from lauryl amines, alpho-sulfo lauric acid, and sodium or potassium soaps derived from the distilled coco fatty acids such as Neo Fat 265 and caprylic acid such as Neo Fat 10.

The amount and kind of collector reagent utilized in our invention is dependent upon several factors. The collectors must be chosen having in mind the size of the floccules to be collected, the mole weight of the metal to be recovered, the pH of the solution and the impurities present that might interfere with the collecting of the metal hydroxide. The pH is considered because, as mentioned, certain collectors are more effective at one pH than at another and specific metals have optimum precipitation at a specific pH. The amount of collector utilized in all cases in our invention is a substoichiometric mole equivalent of collector per mole equivalent of metal to be collected. We prefer to utilize an amount of collector ranging from about 0.001 to 0.9 mole equivalents of collector per mole equivalent of metal ion present in solution. A still more preferable range of equivalent is .01 to 0.1 mole equivalents per mole equivalent of metal ions present.

The collector reagent is generally solubilized in water to a concentration of about 10 to 100 grams per liter before introduction to the metal-containing solution. However, it is preferred, but not essential, to solubilize the collector reagent in a mixture of water and a solvent such as alcohol to a concentration of about 100 grams of collector reagent per liter of water-alcohol mixture. It has been found desirable and beneficial to enhance the collection action of the reagent by adding a frothing agent such as alcohol, and solubilization of the collector reagent in a water-alcohol mixture offers an expedient method of addition to the metal-containing solution. The collector and frothing agent may be added separately, if desired. Isopropyl alcohol, methyl isobutyl carbinol, and pine oil have been used successfully as frothing agents in laboratory testing. The amount of frothing desired, and thus the type and amount of frothing agent addition required to provide a beneficial effect in the process of our invention, must be emipirically determined for any given metal-containing solution.

The collector may be introduced into the metal-containing solution, if desired, in the vapor phase. Thus the collector solvent mixture may be entrained in steam and the steam sparged into the solution. Alternately, the collector may be entrained in an inert gas which would also serve as a bubble medium. Among other things, the rate of collector addition is determined by the concentration of the metals in solution.

The concentration of the collector in the metal solution is one of several variables which determine the efficiency of our process. Generally, collectors have soap-like qualities and tend to form micelles in the solution when their concentration is increased to what is called the critical micelle concentration. The effect that micelle formation has on the practice of our invention is not fully understood. However, if collector micelles are present in the solution to any great extent, it is possible that proper attachment of collector to metal hydroxide will not be obtained. In such cases, it will not be possible for the rising bubbles to collect a portion of the metal hydroxides and the efficiency of our process will be reduced.

The critical micelle concentration is thought to depend upon many variables such as the pH of the solution, the temperature of the solution, and the age of the collector solution. Generally, the critical micelle concentration of collectors ranged from about 0.1 to about 0.001 mole in water solution. For example, the critical micelle concentration of potassium laurate in water is about 0.02 mole, while the critical micelle concentration of potassium myristate in water is about 0.006 mole. Translated into grams, a concentration of 1.5 grams per liter of sodium cetyl sulfate in water would approach the critical micelle concentration. Due to the fact that we utilize substoichiometric mole equivalent of collector per mole equivalent of metals in solution, the critical micelle concentration is not usually reached and thus does not normally present a problem.

The metal hydroxide collected when the above-identified collectors are contacted are removed from solution by flotation, i.e., are removed from solution by means of substantially non-reactive gaseous bubbles. Useful bubble materials include gaseous hydrocarbons such as methane, ethane, and butane; gaseous halogenated hydrocarbons such as the freons; and gases such as air, carbon dioxide, nitrogen and argon. In the recovery process of our invention, we prefer to utilize air to remove the hydroxides from the solution. Further, we prefer to utilize the largest number of the smallest possible bubbles and to have the longest possible bubble path to the surface in order to insure the greatest amount of metal hydroxide collection possible in a given time. In small air cells, it is possible to decrease the relative rate of bubble rise and thereby increase collection efficiency by imparting a countercurrent movement to the solvent in a multi-chambered flotation cell arrangement.

The volume of the bubble fluid is not critical and varies widely with the shape of the solution container, the solution, and the average individual bubble diameter. However, care should be taken that the rate of addition or volume of the bubble fluid or the size of the bubbles are not such that they will unduly disturb the surface of the metal-containing solution during collection. If the bubbles are lifted from the surface by following bubbles, a froth is produced in which the metal hydroxides tend to agglomerate. This froth is easily removed. However, if the bubbles are broken to any great extent by undue turbulence at the surface of the solution, the forming scums are apt to peptize. However, once the scum is formed, it is relatively stable. In the process of our invention, it is, therefore, preferred that no mechanical agitation be employed in the actual flotation chamber such as in normal froth flotation practice.

We prefer to maintain the surface of the liquid in a quiescent state; that is, a state of reduced turbulence where rising bubbles remain substantially intact when they break the surface of the solution.

The insoluble metal hydroxides formed in our process can be removed from the surface of the liquid as a scum or a scum on a froth, depending upon the amount of collector utilized. Scum is herein defined as that insoluble material which presents itself at the surface of either the liquid or froth or both, separate and apart from either liquid or froth, or both. The scum or froth may be removed by means of paddles which skim the insoluble product from the liquid surface or froth into a suitable container or launder. Alternately, an air current may be utilized to blow this scum-bearing froth into a container or launder. The bubbles may also be collected by flowing a small amount of surface solvent over a weir and through filters or into a centrifuge to remove the floating froth. Means for removing froths are well-known in the ore flotation art and can be equally well applied to our process.

Water and air are used as the solvent and bubble medium, respectively, in the preferred embodiment of our invention.

The recovery of pure metal from its hydroxide will not be discussed in detail because it is accomplished by means well-known in the metallurgical art. Perhaps the cheapest and most efficient means to reduce metal hydroxide to its metal is by applying heat, such as by smelting, or the like.

In a second embodiment of our invention, individual metals may be selectively recovered from metal solutions. By selective recovery, it is meant to separate and recover one specific metal as completely as possible from a group of metals present in solution.

In order to selectively recover a metal from a group of metals in solution, it is necessary to carefully control the pH of the solution. Thus, as an alkali hydroxide is added to the solution, the pH of the solution rises and metal hydroxides begin to precipitate as insoluble floccules. The addition of the hydroxide is stopped when the pH range is reached where optimum precipitation occurs for the given metal that is to be recovered first. The pH is retained within this range and a substoichiometric mole equivalent of an ionically charged surface-active collector, per mole equivalent of metal present in solution, is added to the solution along with finely disseminated gas in the form of bubbles. The bubbles buoy the floccules to the surface of the solution, where they are removed as scum.

After the scum has been removed from the surface of the solution, the pH is further increased by the addition of more alkali hydroxide and the pH is adjusted to that range where there is optimum precipitation of that metal which precipitates at a higher pH range than the first insoluble metal recovered. This procedure may be repeated until the solution is completely free of metal in solution.

It has been found that selective recovery of metals is dependent upon the concentration of the metal or metals in solution. For example, selective recovery of iron and copper from solution is most effectively accomplished when the concentration of metals in solution is less than 1.0 gram per liter. At a ratio of .1 gram per liter of copper per .1 gram and less per liter of iron, the copper and iron can be selectively recovered from a solution containing both metals with substantially 100% efficiency. As the ratio of iron to copper increases from .1 to .5 gram of iron to .1 gram of copper per liter of solution, the ability to separately recover the copper from the iron diminishes. At the ratio of .5 gram and above of iron to .1 gram of copper per liter, it is not possible to obtain significant separation of the copper from the iron during recovery. At these concentration ratios, the metals may be recovered simultaneously but not separately. At a ratio of .2 gram of iron to 1. gram of copper per liter, there is partial separation upon recovery and as the concentration ratio of iron to copper approaches 1:1, selectively diminishes.

At solution concentrations in excess of 1 gram of metals per liter of solution, complete separation of the copper and iron does not appear feasible. As the total concentration of metal in solution increases, selectivity in recovery decreases.

In a third embodiment, it is probable that our invention may be used to advantage to recover anionic complexes or cations or cationic complexes that do not normally form hydroxide precipitates but which do tend to adsorb on hydroxide floccules when both are present in solution and to recover other compounds, even non-ionic and organic, which tend to be adsorbed on hydroxide floccules. Thus when it is desired to remove from solution and concentrate very dilute quantities of a given iron that does not form an insoluble hydroxide, a metal hydroxide may be precipitated in or introduced into the solution, the metal hydroxide being chosen so as to allow adsorption of the given ion on the metal hydroxide, which may then be removed from solution according to the practice of our invention.

There are a great many mine operations currently being carried on where our inventive process will find great utility. For example, in the leach-precipitate-flotation process, our invention will serve as a substitute for the precipitate-flotation steps with a substantial increase in efficiency in the percent of recovery and also with savings in equipment and materials. Also, there will be significant savings through the utilization of our selective recovery process on those dilute solutions containing relatively inexpensive metals such as copper, and the like, that are at present being discarded due to excessive extraction costs.

It is not intended that our invention be restricted to the exact steps, concentrations, reagents, or metal hydroxides collected. Rather, it is intended that all equivalents be included within the scope of our invention as claimed.

EXAMPLE I

A recovery apparatus was prepared consisting of a funnel having an 8.4 cm. diameter sintered glass bottom plate. The funnel was fitted with a rubber collar which was shaped to provide a run-off trough to facilitate collection of the scum-bearing froth. Air was passed, when desired, through the bottom of the funnel at a rate sufficient to insure a well-distributed column of bubbles and at a rate sufficient to cause no undue turbulence at the surface of the soltion.

The above apparatus will be hereinafter referred to as an air cell.

Using the apparatus above described, recovery of iron from solution was tested as follows: 10 grams of ferric chloride $FeCl_3 \cdot 6H_2O$ were dissolved in distilled water and diluted to 200 ml. 10 ml. of this solution were diluted to a total of 400 ml. with distilled water, which was the capacity of the air cell. The solution contained 103 mg. of iron, or an equivalent concentration of about .257 g./l.

Alpha-sulfolauric acid was made up as .2 g./50 ml. in ethanol as the surface-active collector reagent.

The 400 ml. of solution was placed in the air cell and air was passed through the bottom of the funnel for a few minutes before the hydroxide was added.

Sufficient sodium hydroxide was added to raise the pH of the solution to 7 and iron hydroxide floccules formed in the solution. The solution was then treated with .5 ml. of alpha-sulfolauric acid solution, made up as above described. The air bubbles floated the iron hydroxide precipitate to the surface of the solution, and it was removed therefrom as a filterable scum. The collected scum was analyzed, and it was found that 98.1% of the iron was recovered.

Utilizing the same procedure as outlined above and adding 1. ml. of alpha-sulpholauric acid solution instead of 0.5 ml. yielded a 99.6% recovery of iro nfrom solution.

EXAMPLE II

Using the air cell described in relation to Example I, recovery of copper from solution was tested as follows:

10 grams of copper sulfate ($CuSO_4 \cdot 5H_2O$) was dissolved in deionized water and diluted to 200 ml. 10 ml. of the solution was taken and diluted to about 400 ml. The 400 ml. solution then contained 127 mg. of copper, or a concentration of about .31 g./l.

Reagent was made up as indicated in Example I. The surface-active reagent used was the sodium salt of a fatty acid having an aliphatic radical containing from 6 to 22 carbon atoms and sold under the trade name Neo-Fat 265 by Armour and Company.

The 400 ml. of solution was transferred to the air cell as described in Example I, and sufficient sodium hydroxide was added to raise the pH of the solution to 7.0. Copper hydroxide floccules were visible in the solution. Air was passed through the solution and .5 ml. of reagent solution was added. A blue scum formed very rapidly at the surface of the solution and was collected. The scum and remaining liquid were analyzed for copper content, and it was found that the scum contained in excess of 99% of the total copper present.

EXAMPLE III

Using the air cell apparatus described in relation to Example I, recovery of chromium from solution was tested as follows:

10 grams of chromic chloride ($CrCl_3 \cdot 6H_2O$) were dissolved in 200 ml. of distilled water. 2 ml. were used and diluted to about 400 ml. with distilled water. This amounted to .1 gram of $CrCl_3 \cdot 6H_2O$, or about .05 g./l. of chromium ion in solution. Reagent was made up as indicated in Example I. The surface-active reagent used was alpha-sulfolauric acid. The 400 ml. of solution were transferred to the air cell and sufficient sodium hydroxide was added to raise the pH of the solution to in excess of 6. Chromium hydroxide floccules were visible in the solution. Air was passed through the solution and 2 ml. of reagent solution were added. A scum formed very rapidly at the surface of the solution and was collected. Scum and remaining liquor were analyzed for chromium content, and it was found that the scum contained in exces of 98% of the total chromium present.

EXAMPLE IV

Using the air cell apparatus described in relation to Example I, recovery of magnesium from solution was tested as follows:

10 grams of magnesium sulfate ($MgSO_4 \cdot 7H_2O$) were dissolved in 200 ml. of distilled water. 10 ml. of the solution were taken and diluted to about 400 ml. The 400 ml. solution then contained 50 mg. of magnesium, or about .125 g./l.

The following is a table showing an analysis of the recovery from each collection:

| pH | Product | Fe, mg. | Mg. Fe$_2$O$_3$ | Percent distribution | Cu, mg. | Mg. CuO | Percent distribution | Approx. percent Cu in coll. products basis theoret. dry wt. of metal oxides |
|---|---|---|---|---|---|---|---|---|
| 5.1 | 1st collection | 5.9 | 8.44 | 61.3 | 6.9 | 8.6 | 10.2 | 40.5 |
| 5.5 | 2nd collection | 2.2 | 3.14 | 22.8 | 11.4 | 14.3 | 16.9 | 65.4 |
| 6.1 | 3rd collection | 1.05 | 1.50 | 10.9 | 25.4 | 31.8 | 37.7 | 76.3 |
| 8.1 | 4th collection | .35 | .50 | 3.6 | 20.1 | 25.2 | 29.9 | 78.2 |
|  | Liquor | .13 |  | 1.3 | 3.5 | 4.4 | 5.2 |  |
|  | Total | 9.63 |  |  | 67.3 |  |  |  |

Theoretical 10 mg. Fe and 64 mg. Cu.

Reagent was made up as indicated in Example I. The surface-active reagent used was alpha-sulfolauric acid solution.

The 400 ml. of solution were transferred to the air cell and sufficient sodium hydroxide was added to raise the pH of the solution to 10.5 Magnesium hydroxide floccules were visible in the solution. Air was passed through the solution and 1.5 ml. of reagent solution was added. A scum formed very rapidly at the surface of the solution and was collected. The scum and remaining liquor were analyzed for magnesium content, and it was found that the scum contained in excess of 98% of the total magnesium present.

EXAMPLE V

Using the air cell apparatus described in relation to Example I, iron and copper were selectively recovered from solution as follows:

5 ml. of copper sulfate solution (containing 64 mg. of copper) were mixed with 1 ml. of ferric chloride solution, containing 10 mg. of Fe, and diluted to 400 ml. with deionized water and placed in the air cell.

The same reagent was used in Example V as that used in Example II.

The pH was lowered to 2.5, using sulfuric acid, to duplicate a leach solution. The solution was then adjusted to a pH of 5.1 with 5% sodium hydroxide.

Air was passed through the air cell and .5 ml. of reagent was added to the solution. A brown scum appeared at the surface of the solution and was removed and labeled "first collection." A second portion of sodium hydroxide was added to raise the pH to 5.5. .2 ml. of reagent was added to produce a green scum; this was removed and labeled "second collection." A third portion of sodium hydroxide was added to raise the pH to 6.1. After .1 ml. of reagent was added, a blue-green scum appeared at the surface which was removed and labeled "third collection." The fourth and final addition of sodium hydroxide raised the pH to 8.9. .1 ml. of reagent was added and a blue scum appeared at the surface of the solution, which was removed and labeled "fourth collection." The remaining solution was clear.

EXAMPLE VI

A 500 gram sample of copper ore was deslimed with three 500 ml. additions of water and decantation. The resulting sands were charged to a porcelain roll mill and 500 ml. of water were added. The pH of the pulp was adjusted to 1.6 with sulfuric acid. The pulp was rolled for 10 minutes and then deslimed by decantation into the original decanted slimes. The pulp was washed four times with 200 ml. of water in each wash to a final pH of 3.6. The slimes and wash waters were combined and allowed to stand overnight after readjustment of the pH of from 2.0 to 2.6. The leach liquor was decanted and filtered. Analysis of the liquor indicated 10 mg. per liter of iron and 125 mg. per liter of copper.

Using the air cell apparatus described in relation to Example I, iron and copper were selectively recovered from solution as follows: A 350 ml. portion of the leach liquor was treated with sodium hydroxide to a pH of 4.8 to precipitate iron and transferred to an air cell. The surface-active collector reagent was the sodium salt of Neo-Fat 265 (RD-3219-F). Approximately .0012 grams of the collector reagent was added to the liquor, and the air was turned on. A greenish-brown scum readily collected on the froth and was removed by skimming and labeled "first collection." A second portion of sodium hydroxide was added to the solution and the pH was raised to 5.2. .004 grams of surface-active collector was added to produce a blue scum on the froth that was collected and labeled "second collection." A third portion of sodium hydroxide was added to raise the pH of the solution to 5.25. .008 grams of surface-active collector was added to produce a blue scum that was collected and labeled "third collection." A fourth portion of sodium hydroxide was added to the solution to raise the pH to 5.75. Aeration continued without further addition of surface-active collector and a blue scum was collected and labeled "fourth collection." A fifth portion of sodium hydroxide was added to raise the pH of the solution to 8.1 and .008 grams of surface-active collector was added. A blue scum appeared at the surface and was collected and labeled "fifth collection." The remaining solution in the air cell was devoid of color and was crystal clear.

The following is a table showing an analysis of the recovery from each collection:

| Product | Analysis | | | | Percent distribution | | Approx. percent grade coll. products basis theoret. dry wt. of metal oxides | |
|---|---|---|---|---|---|---|---|---|
|  | Mg., Fe | Mg. Fe$_2$O$_3$ | Mg. Cu | Mg. CuO | Fe | Cu | Percent Fe | Percent Cu |
| 1st collection | 1.91 | 2.73 | 6.10 | 7.64 | 51.3 | 12.1 | 18.4 | 58.8 |
| 2nd collection | 0.80 | 1.14 | 7.55 | 9.45 | 21.5 | 15.0 | 7.6 | 71.3 |
| 3rd collection | 0.55 | 0.79 | 11.90 | 14.90 | 14.8 | 23.6 | 3.5 | 75.8 |
| 4th collection | 0.33 | 0.47 | 20.25 | 25.35 | 8.9 | 40.2 | 1.3 | 78.4 |
| 5th collection | 0.13 | 0.19 | 4.17 | 5.22 | 3.5 | 8.3 | 2.3 | 77.1 |
| Tailing solution | 0.004 |  | 0.42 |  | 0.1 | 0.8 |  |  |
| Composite | 3.724 | 5.32 | 50.39 | 62.56 | 100.1 | 100.0 | 5.5 | 73.7 |

EXAMPLE VII

Using the air cell apparatus described in relation to Example I, iron and copper were selectively recovered from solution at various concentration ratios. A series of synthetic solutions were prepared from Fe:Cu ratios of 0.2:1, 1:1, 2:1 and 5:1. The concentration of copper was maintained at 0.1 g./l. in the first series of tests and at 1.0 g./l. in the second series. The iron concentration was adjusted accordingly to obtain the indicated ratios. The salts $CuSO_4 \cdot 5H_2O$ and $FeCl_3 \cdot 6H_2O$ were made up in 400 ml. samples to provide the necessary metal concentrations in solution for testing.

A 400 ml. sample of the solution being tested was transferred to the air cell and air was passed through the bottom of the funnel for a few minutes before any hydroxide was added. Appropriate amounts of sodium hydroxide were added to obtain the indicated pH level, and those amounts of surface-active collector indicated in the tables were also added incrementally. The exact pH values obtained and amounts of surface-active collector added are shown in the following tables. The procedure used for making up the surface-active collector was the same as in Example I and Example II.

After addition of each increment of sodium hydroxide and collector, the solids suspended on the froth were removed by skimming until barren of color before changing the pH and adding more surface-active collector for the next collection. The products were collected separately and labeled first collection, second collection, etc. This procedure was followed for each test.

TEST 1
[Ratio of Fe:Cu in Solution=0.2:1; Cu Concentration=0.1 g./l.]

| Collection Product | pH in cell | Collection added, grams | Analyses | | | | Percent distribution | | Approx. percent Grade in Collection Products basis theoret. dry wt. of metal oxides | |
|---|---|---|---|---|---|---|---|---|---|---|
| | | | Mg. Fe | Calc. mg. Fe₂O₃ | Mg. Cu | Calc. Mg. CuO | Fe | Cu | Percent Fe | Percent Cu |
| 1st | 4.0 | 0.0012 | 5.16 | 7.4 | 1.30 | 1.6 | 72.7 | 3.2 | 57.8 | 14.4 |
| 2nd | 5.0 | None | 1.50 | 2.1 | 4.50 | 5.6 | 21.1 | 11.2 | 19.5 | 58.4 |
| 3rd | 5.4 | 0.0008 | 0.42 | .6 | 4.94 | 6.1 | 5.9 | 12.3 | 6.0 | 73.1 |
| 4th | 5.8 | 0.0004 | 0.01 | .02 | 19.20 | 24.0 | 0.1 | 47.8 | 0.04 | 80.0 |
| 5th | 6.8 | 0.0004 | 0.01 | .02 | 9.82 | 12.3 | 0.1 | 24.4 | 0.08 | 79.7 |
| Effluent | | | Trace | | 0.43 | | Trace | 1.1 | | |
| Composites | | 0.0028 | 7.10 | 10.14 | 40.19 | 49.6 | 99.9 | 100.0 | 11.9 | 66.6 |

TEST 2
[Ratio of Fe:Cu in Solution=1:1; Cu Concentration=0.1 g./l.]

| Collection Product | pH in cell | Collection added, grams | Mg. Fe | Calc. mg. Fe₂O₃ | Mg. Cu | Calc. Mg. CuO | Fe | Cu | Percent Fe | Percent Cu |
|---|---|---|---|---|---|---|---|---|---|---|
| 1st | 4.2 | 0.0016 | 37.0 | 52.8 | 2.80 | 3.5 | 89.3 | 7.1 | 65.7 | 5.0 |
| 2nd | 4.8 | 0.0004 | 3.6 | 5.1 | 7.60 | 9.5 | 8.7 | 19.2 | 24.6 | 52.1 |
| 3rd | 5.0 | 0.0004 | 0.8 | 1.2 | 8.9 | 11.1 | 1.9 | 22.5 | 6.5 | 72.4 |
| 4th | 7.1 | 0.0004 | 0.01 | .02 | 19.3 | 24.2 | | 48.9 | 0.04 | 79.8 |
| Effluent | | | 0.04 | | 0.9 | | 0.1 | 2.3 | | |
| Composites | | 0.0028 | 41.45 | 59.12 | 39.5 | 48.3 | 100.0 | 100.0 | 38.2 | 35.9 |

TEST 3
[Ratio of Fe:Cu in Solution=2:1; Cu Concentration=0.1 g./l.]

| Collection Product | pH in cell | Collection added, grams | Mg. Fe | Calc. mg. Fe₂O₃ | Mg. Cu | Calc. Mg. CuO | Fe | Cu | Percent Fe | Percent Cu |
|---|---|---|---|---|---|---|---|---|---|---|
| 1st | 4.2 | 0.0012 | 37.5 | 53.55 | 5.0 | 6.3 | 47.0 | 11.7 | 62.6 | 8.3 |
| 2nd | 5.0 | 0.0008 | 38.0 | 54.26 | 17.0 | 21.3 | 47.6 | 39.9 | 50.3 | 22.5 |
| 3rd | 5.4 | 0.0004 | 3.2 | 4.57 | 11.9 | 14.9 | 4.0 | 27.9 | 16.4 | 61.0 |
| 4th | 7.0 | 0.0008 | 1.0 | 1.43 | 7.5 | 9.4 | 1.2 | 17.6 | 9.3 | 69.4 |
| Effluent | | | 0.04 | | 1.2 | | 0.1 | 2.8 | | |
| Composites | | 0.0032 | 79.74 | 113.81 | 42.6 | 51.9 | 99.9 | 99.9 | 48.1 | 25.0 |

TEST 4
[Ratio of Fe:Cu in Solution=5:1; Cu Concentration=0.1 g./l.]

| Collection Product | pH in cell | Collection added, grams | Mg. Fe | Calc. mg. Fe₂O₃ | Mg. Cu | Calc. Mg. CuO | Fe | Cu | Percent Fe | Percent Cu |
|---|---|---|---|---|---|---|---|---|---|---|
| 1st | 4.8 | 0.0020 | 165.0 | 235.6 | 27.8 | 34.8 | 82.3 | 63.9 | 61.0 | 10.3 |
| 2nd | 5.4 | 0.0004 | 18.5 | 26.4 | 6.4 | 8.0 | 9.2 | 14.7 | 53.2 | 18.4 |
| 3rd | 6.0 | 0.0008 | 11.3 | 16.1 | 7.6 | 9.5 | 5.6 | 17.5 | 44.1 | 29.7 |
| 4th | 7.0 | 0.0004 | 3.7 | 5.3 | 1.4 | 1.8 | 1.8 | 3.2 | 52.1 | 19.7 |
| Effluent | | | 2.1 | | 0.3 | | 1.1 | 0.7 | | |
| Composites | | 0.0036 | 200.6 | 283.4 | 43.5 | 54.1 | 100.0 | 100.0 | 59.0 | 12.8 |

TEST 5
[Ratio of Fe:Cu in Solution=0.2:1; Cu Concentration=1.0 g./l.]

| Collection Product | pH in cell | Collection added, grams | Mg. Fe | Calc. mg. Fe₂O₃ | Mg. Cu | Calc. Mg. CuO | Fe | Cu | Percent Fe | Percent Cu |
|---|---|---|---|---|---|---|---|---|---|---|
| 1st | 4.6 | 0.0020 | 49.0 | 70.1 | 48.8 | 61.1 | 55.7 | 12.0 | 37.3 | 37.2 |
| 2nd | 5.6 | 0.0020 | 15.0 | 21.4 | 114.4 | 143.2 | 17.1 | 28.4 | 9.1 | 69.5 |
| 3rd | 7.0 | 0.0020 | 23.0 | 32.9 | 236.2 | 295.6 | 26.2 | 58.5 | 7.0 | 71.9 |
| Effluent | | | 0.8 | | 5.1 | | 0.9 | 1.2 | | |
| Composites | | 0.0060 | 87.8 | 124.4 | 404.5 | 499.9 | 99.9 | 100.1 | 14.0 | 64.0 |

TEST 6
[Ratio of Fe:Cu in Solution=1:1; Cu Concentration=1.0 g./l.]

| Collection Product | pH in cell | Collection added, grams | Mg. Fe | Calc. mg. Fe₂O₃ | Mg. Cu | Calc. Mg. CuO | Fe | Cu | Percent Fe | Percent Cu |
|---|---|---|---|---|---|---|---|---|---|---|
| 1st | 3.9 | 0.0020 | 14.0 | 20.0 | 7.7 | 9.6 | 3.3 | 2.0 | 47.3 | 26.0 |
| 2nd | 4.4 | 0.0020 | 53.0 | 75.7 | 27.1 | 33.9 | 12.4 | 6.9 | 48.3 | 24.7 |
| 3rd | 4.8 | None | 32.5 | 46.4 | 19.3 | 24.2 | 7.6 | 4.9 | 46.0 | 27.3 |
| 4th | 5.0 | 0.0008 | 63.5 | 90.7 | 51.8 | 64.9 | 14.8 | 13.1 | 40.8 | 33.3 |
| 5th | 5.3 | 0.0020 | 78.0 | 111.4 | 86.2 | 107.9 | 18.2 | 21.8 | 35.6 | 39.3 |
| 6th | 6.4 | 0.0024 | 123.0 | 175.6 | 162.0 | 203.0 | 28.8 | 41.1 | 32.5 | 42.8 |
| 7th | | 0.0028 | 63.0 | 90.0 | 39.6 | 49.6 | 14.7 | 10.0 | 45.1 | 28.3 |
| Effluent | | | 0.7 | | 0.8 | | 0.2 | 0.2 | | |
| Composites | | 0.0120 | 427.7 | 609.8 | 394.5 | 493.1 | 100.0 | 100.0 | 38.7 | 35.6 |

EXAMPLE VIII

Using the air cell apparatus described in relation to Example I, iron, copper, and zinc were selectively recovered from solution as follows:

400 ml. of solution containing about 0.50 g./l. Fe, 0.64 g./l. Cu, and 0.57 g./l. Zn were placed in the air cell and neutralized by increment addition of sodium hydroxide. As each desired pH value was reached, the solution was treated with collector and the resulting froth product was removed. The same reagent was used in Example VIII as that used in Example II.

The following is a table showing an analysis of the products from each collection:

| Product | pH | Amount collector, g. | Analyses | | | | | | Percent Distribution | | | Percent Fe | Percent Cu | Percent Zn |
|---|---|---|---|---|---|---|---|---|---|---|---|---|---|---|
| | | | Mg. Fe | Mg. Fe$_2$O$_3$ | Mg. Cu | Mg. CuO | Mg. Zn | Mg. ZnO | Fe | Cu | Zn | | | |
| 1st collection | 5.2 | 0.0064 | 113.1 | 161.7 | 88.0 | 110.1 | 32.8 | 40.7 | 58.2 | 35.7 | 13.7 | 36.2 | 28.2 | 10.5 |
| 2nd collection | 5.8 | 0.0024 | 76.8 | 109.8 | 114.3 | 143.1 | 38.6 | 47.9 | 39.5 | 46.3 | 16.2 | 25.5 | 38.0 | 12.8 |
| 3rd collection | 6.3 | | 4.2 | 6.0 | 40.2 | 50.4 | 38.7 | 48.0 | 2.2 | 16.3 | 16.2 | 4.0 | 38.5 | 37.1 |
| 4th collection | 6.6 | | | | 3.2 | 4.0 | 51.3 | 63.6 | | 1.3 | 21.5 | | 4.7 | 75.9 |
| 5th collection | 8.0 | 0.0016 | 0.1 | 0.1 | 0.7 | 0.9 | 40.4 | 50.1 | 0.1 | 0.3 | 16.9 | 0.2 | 1.4 | 79.1 |
| Tailing solution | | | | | 0.3 | | 37.1 | | | 0.1 | 15.5 | | | |
| Composites | | 0.0104 | 194.2 | 277.6 | 246.7 | 308.5 | 238.9 | 250.3 | 100.0 | 100.0 | 100.0 | 23.2 | 29.5 | 24.1 |

EXAMPLE IX

Tests were carried out to determine the selectivity in recovery of iron, copper and zinc from solution, as their respective hydroxides. The testing involved incorporation of zinc into a synthetic liquor to note the selectivity possible in the presence of iron and copper. The metals were added by using measured amounts of stock solutions made up at 10 g./200 ml.

400 ml. of solution were neutralized by increment sodium hydroxide addition in the air cell. At each pH level the solution was treated with collector and the product collected. This was resolubilized and analyzed for iron, copper and zinc, as was the remaining liquor. The collector was the sodium salt Neo-Fat 265.

The recoveries as hydroxide for the iron were in excess of 99%, for the copper in excess of 98%, and for the zinc in excess of 85%. The zinc recovery would have been much higher in the test had aeration been allowed to continue.

EXAMPLE X

In a test to determine the utility of the process in the purification of water, the following was carried out:

A dilute solution of Chlorazol Sky Blue FF was placed in the air cell apparatus. This was a faint blue clear solution. This dye is anionic and will not float using an anionic collector. 5 ml. of aluminum sulphate solution was added, corresponding to the addition of 0.001 mole of aluminum. The pH was raised to 6.5, and two drops of 0.2 molar alphasulphuric ostearic acid made up in alcohol was added and air was passed into the solution. All the blue color was adsorbed by the alumina floc and was floated to the surface, leaving the solution colorless.

Humic acids which color some natural waters will behave in the same way.

EXAMPLE XI

The process is also useful in the floating of silicic acid gel. The floating of silicic acid is important because silicic acid is gelatinous and difficult to filter and because separation of metal ions from silica, which is always a problem, can be made selective between metal ions and silicic acid by the herein-described process of precipitate flotation.

The above processes of precipitate flotation can be further enhanced by the use of a solvent. Precipitate flotation is often not as irreversible as simple ion flotation, and the hydroxides may settle down into the solution, if bubbling ceases. By providing a solvent, there is a tendency for the hydroxides to stick inside the solvent.

While in the foregoing specification we have set forth procedural steps in considerable detail for the purpose of illustrating embodiments of the invention, it will be understood that such details may be varied widely by those skilled in the art without departing from the spirit of our invention.

We claim:
1. In a process for the recovery of a metal from solution, the steps of precipitating the metal as an insoluble, unfilterable, metal hydroxide by the addition of hydroxyl ions, contacting the precipitated metal hydroxide with an ionically charged surface-active collector reagent to render the hydroxide hydrophobic and filterable, maintaining the surface of the solution in a quiescent state while introducing finely divided gas in the form of bubbles to buoy the hydroxide precipitate to the surface of the solution as a scum, withdrawing the scum, and reducing the hydroxides to recover the metal.

2. The process of claim 1 in which the metal hydroxide is heated to recover the metal.

3. In a process for recovering at least two metals from solution, one of said metal precipitating at a lower pH and the other at a higher pH through the addition of hydroxyl ions, the steps of adding a first portion of alkali hydroxide to the solution to raise the pH of the solution to that point where said first-mentioned metal precipitates as an unfilterable metal hydroxide, contacting the precipitate with an ionically charged surface-active collector reagent to render the hydroxide hydrophobic and filterable, maintaining the surface of the solution in a quiescent state while introducing finely divided gas in the form of bubbles for buoying the precipitate as scum to the surface of the solution, removing the scum from said surface, adding a second portion of alkali hydroxide to the solution to further raise the pH of the solution to that point at which said second-mentioned metal precipitates to precipitate said second-mentioned metal as metal hydroxide, contacting said second precipitate with an ionically charged surface-active reagent, introducing finely divided gas in the form of bubbles to buoy said second precipitate as scum to the surface of the solution, removing said second-mentioned scum, and reducing the hydroxides to metal.

4. A process for recovering metallic ions from solution, comprising adding to the solution hydroxyl ions to raise the pH of the solution to between 2 and 12 to precipitate insoluble, unfilterable metal hydroxide floccules, contacting the floccules with from .001 to .9 equivalents of surface-active collector per equivalent metal ion present in the solution to render said floccules hydrophobic and filterable, maintaining the surface of said solution in a quiescent state while introducing finely divided gas in the form of bubbles to buoy the metal hydroxide precipitate as scum to the surface of the solution, removing said scum, and reducing the metal hydroxide to metal.

5. The process of claim 4 in which the amount of surface-active collector is .01 equivalents of collector per equivalent metal ion in solution.

6. The process of claim 4 in which the pH of the solution is raised from about 7.0 to 9.0.

7. In a process for recovering metal ions from solution, some of said ions precipitating at a lower selected pH and others precipitating at a higher selected pH, the steps of adding to the solution alkali hydroxide to bring the pH of the solution to that selected point in the range of 2 to 12 in which said first-mentioned metallic ions precipitate as an insoluble, unfilterable precipitate, contacting this precipitate with an ionically charged surface-active collector reagent to render the precipitate hydrophobic and filterable, maintaining the surface of the solution in a quiescent state while introducing finely divided gas in the form of bubbles to buoy the precipitate as scum to the surface of the solution, removing said scum, adding a seocnd portion of alkali hydroxide to the solution to further raise the pH in the range of 2 to 12 to that selected point at which said second-mentioned metal ions precipitate to precipitate said ions as metal hydroxides, contacting the second precipitate with an ionically charged surface-active reagent, maintaining the surface of the solution quiescent while introducing finely divided gas in the form of bubbles to buoy the second precipitate as scum to the surface of the solution, removing said second scum, and reducing the hydroxides in each scum to metal.

References Cited

UNITED STATES PATENTS

| | | | |
|---|---|---|---|
| 1,333,393 | 3/1920 | Edser et al. | 210—44 |
| 2,254,976 | 9/1941 | Powell | 75—108 |
| 2,375,506 | 5/1945 | Turck | 75—108 |
| 2,726,151 | 12/1955 | Kern | 75—108 |
| 2,734,821 | 2/1956 | Schaufelberger | 75—108 |
| 2,787,540 | 4/1957 | Appell | 75—108 |
| 2,863,762 | 12/1958 | Pullen | 75—108 |
| 2,970,051 | 1/1961 | Mackiw et al. | 75—108 |
| 3,203,968 | 8/1965 | Sebba | 260—429.1 |

L. DEWAYNE RUTLEDG, Primary Examiner

T. R. FRYE, Assistant Examiner

U.S. Cl. X.R.

75—121